(No Model.)
C. C. GILMAN.
HOUSING AND INSULATION OF ELECTRICAL WIRES UNDERGROUND.
No. 288,629. Patented Nov. 20, 1883.
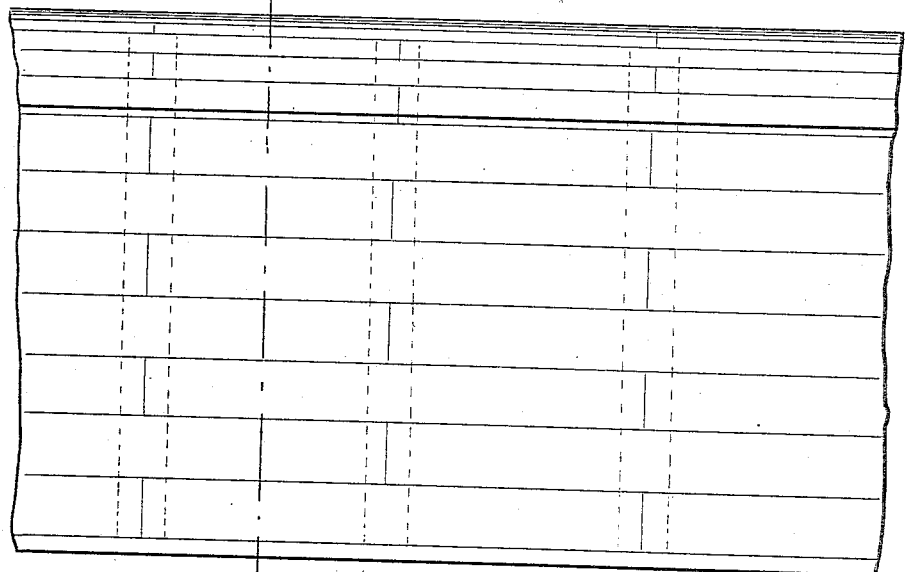
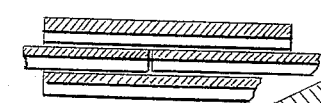
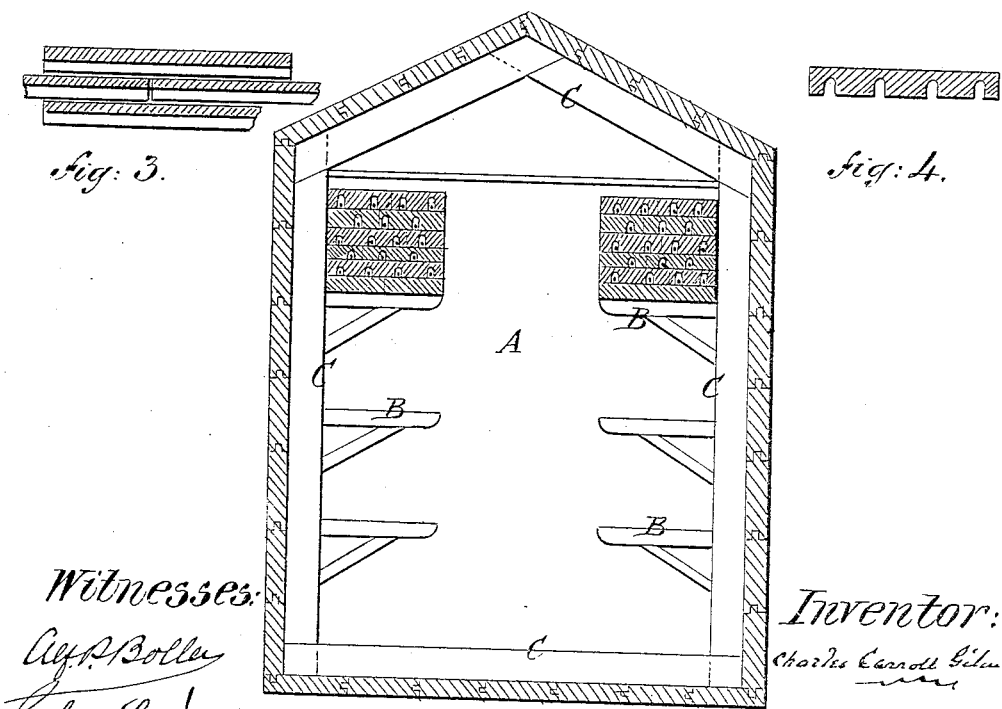
Witnesses:
Alf. P. Bolles
Chas. L. Scott
Inventor:
Charles Carroll Gilman

UNITED STATES PATENT OFFICE.

CHARLES C. GILMAN, OF ELDORA, IOWA.

HOUSING AND INSULATION OF ELECTRICAL WIRES UNDERGROUND.

SPECIFICATION forming part of Letters Patent No. 288,629, dated November 20, 1883.

Application filed December 5, 1881. (No model.)

*To all whom it may concern:*

Be it known that I, CHARLES CARROLL GILMAN, a citizen of the United States, and a resident of Eldora, Hardin county, State of Iowa, have invented a new and useful Improvement in the Housing and Insulation of Electrical Wires Beneath the Surface of the Ground; and the following description, with the drawings attached, to which reference is had, I declare to be a correct specification of the same.

My invention relates to the protection and insulation underground of electrical conductors. I use as the material for the construction of a protecting and insulating underground inclosure terra-cotta composed of kaolin-clay, and made porous or cellular by the means and in the manner described in United States Letters Patent No. 248,094, dated October 11, 1881—namely, by mixing with the clay in its preparation one or two parts, by measure, of resinous wood, sawdust, or equivalent comminuted combustible matter, which is consumed in the burning of the ware, leaving it of a highly-cellular structure, forming an earthenware that will receive and take up into itself mineral bitumen, so as to become saturated therewith, and be thus rendered throughout impervious to water, and also having a structure into or through which spikes or nails may be driven without fracturing it, this ware, when made of clay free from sand or grit, being susceptible, after firing, also of being sawed or dressed with edge-tools into boards, planks, and other desired forms, and such forms fitted together to make close joints, as wood may be wrought. I construct from the said cellular terra-cotta an underground inclosure in which to lay electrical conductors — for example, telegraph-wires—preferably as follows: I prepare slabs or planks of the above-described cellular terra-cotta, of suitable size, and form a section of a trough or conduit of the desired dimensions to contain the insulated electric conductors which I design to place in it. They may be, for example, twelve to twenty-four inches wide, two inches thick, and from three to four feet long. I saw or plane them to a uniform thickness, and preferably tongue and groove their edges and ends, so that when put together they will form tight joints. When thus prepared, I plunge them into highly-heated mineral asphaltum, sometimes known as "Trinidad pitch," and allow them to remain therein until the pitch has penetrated and permeated the cellular structure of the terra-cotta to such an extent that the pitch cannot be detached or separated from the terra-cotta without destroying or breaking up the terra-cotta itself. If planks of one or two inches in thickness are allowed to remain in the heated pitch a sufficient length of time—say from one to two hours—they will be permeated and saturated through and through with the pitch; but if the pitch penetrates the terra-cotta to the extent of one-fourth to one-half an inch, that is usually sufficient for the present purpose. After these slabs or planks are sufficiently saturated with the hot pitch they are removed therefrom with their surfaces covered with the pitch, that adheres to them. In this condition, and while the pitch is still hot, the planks are to be put together to form a casing or conduit, laid in a trench in the ground or sheathing in the form of an underground tunnel.

Tongued-and-grooved joints with the surfaces covered with the hot asphaltum may be formed both at the adjacent edges and ends of the planks, and the planks may be nailed or spiked together, as wood planks can be, to form a closed indestructible water and air tight underground inclosure for the conductors. The conductors may be insulated from one another within the conduit by being suspended on insulating-brackets or in any other desired way. I prefer, however, to employ for the purpose the above-described cellular terra-cotta saturated with asphaltum. To this end I cut channels in the surface of plates of the terra-cotta before dipping them in the heated asphaltum, and lay these plates, while the asphaltum is hot, within the above-described case or conduit, one upon another, with the conductors laid in the channels and embedded therein in the asphaltum. The conduit may be filled with successive layers of these plates, inclosing the conductors between them.

It is preferable to saturate the terra-cotta slabs or planks at the manufactory at which they are made before being transported to the place where they are to be used. When this is done, they must be again dipped in hot pitch before being put together to form the conduit, in order that the joints where the planks come together may be hermetically sealed by the pitch.

In the accompanying drawings I represent one form of conduit or inclosure for electric conductors which is constructed of the described cellular terra-cotta saturated with asphalt; but I do not, of course, intend to limit myself to the special form shown. Any suitable form and size of conduit may be constructed and used.

Figure 1 is a longitudinal view of the outside of such a conduit. Fig. 2 is a vertical section of the same on line $f\,f$, Fig. 1, showing the frame-work of the interior, with brackets in which the wires may be carried. Fig. 3 represents a longitudinal section of three of the described cellular terra-cotta planks, grooved for the reception of the wires, and laid one upon another, the same being intended to be saturated and covered with bitumen, as before described; and Fig. 4 represents a single slab of the said terra-cotta, showing grooves for the wires.

What I claim as my invention, and desire to secure by Letters Patent, is—

An underground insulating water-tight conduit composed of the described cellular terra-cotta saturated with asphaltum, inclosing and insulating one or more electrical conductors, as described.

CHARLES CARROLL GILMAN.

Witnesses:
SEWALL SERGEANT,
CHAS. L. SCOTT.